United States Patent [19]

Brigden

[11] Patent Number: 5,599,034
[45] Date of Patent: Feb. 4, 1997

[54] SINGLE ARM BICYCLE SUSPENSION FORK

[76] Inventor: Paul H. Brigden, 1167 Valour Rd., Winnipeg, Manitoba, Canada, R3E 2W6

[21] Appl. No.: 393,382

[22] Filed: Feb. 23, 1995

[30] Foreign Application Priority Data

Feb. 24, 1994 [CA] Canada ................... 2116414

[51] Int. Cl.$^6$ ............................... B62K 21/20
[52] U.S. Cl. .......................... 280/276; 280/280
[58] Field of Search .................... 280/276, 275, 280/280, 279

[56] References Cited

U.S. PATENT DOCUMENTS

| 423,471 | 3/1890 | Easthope | 280/276 |
|---|---|---|---|
| 602,354 | 4/1898 | Ohlgart | 280/276 |
| 739,476 | 9/1903 | Becker | 280/276 |
| 913,961 | 3/1909 | Levedahl | 280/276 |
| 946,143 | 1/1910 | Levedahl | 280/276 |
| 1,452,436 | 4/1923 | Pullin | 280/276 |
| 2,752,167 | 6/1956 | Propst et al. | 280/276 |
| 3,944,254 | 3/1976 | Inui | 280/276 |
| 5,069,467 | 12/1991 | Claudio | 280/276 |
| 5,354,085 | 10/1994 | Gally | 280/276 X |
| 5,441,291 | 8/1995 | Girvin, III | 280/276 |

FOREIGN PATENT DOCUMENTS

| 0347724 | 3/1905 | France | 280/276 |
|---|---|---|---|
| 0279630 | 11/1927 | United Kingdom | 280/276 |

Primary Examiner—Brian L. Johnson
Assistant Examiner—F. Zeender
Attorney, Agent, or Firm—Murray E. Thrift; Adrian D. Battison

[57] ABSTRACT

A bicycle fork is used with a bicycle having a conventional head tube. The fork has a steering column that is supported in the head tube and carries a forwardly-connecting stem on which the handle bars are mounted. At the bottom end of the steering column is a control arm pivotally connected to the steering column and extending forwardly to be connected pivotally to the fork crown. The fork crown is connected to the stem at the top of the steering column by a spring-damping shock-absorbing strut, pinned at the top to the stem. The system may be used on a standard bicycle without altering the head tube or the bicycle geometry to provide a shock-absorbing action at the front of the bicycle. By arranging the control arm at an appropriate angle to the strut, an anti-diving action is incorporated into the fork.

12 Claims, 3 Drawing Sheets

SINGLE ARM BICYCLE SUSPENSION FORK

FIELD OF THE INVENTION

The present invention relates to bicycles and more particularly to a shock-absorbing system for bicycle front forks.

BACKGROUND

Various shock-absorbing fork systems for bicycles have been proposed. These are often complex and expensive arrangements. In some cases, they raise the head tube of the bicycle to accommodate the additional components, thus altering the riding geometry of the bicycle. Some proposals also introduce an undesirable "diving" of the frame when the front brakes are applied.

The present invention proposes a novel front fork for a bicycle which mitigates the problems with the prior art.

SUMMARY

According to the present invention there is provided a bicycle fork for use with a bicycle having a frame with a head tube, said fork comprising:

a steering column adapted to be mounted rotatably in the head tube;

steering means secured to the steering column for rotating the steering column;

a strut comprising a linearly extendible and contractible shock absorber;

a fork extending downwardly from the strut for mounting a bicycle wheel for rotation about a lateral wheel axis;

upper strut mounting means connecting an upper end of the strut to the steering column for pivotal movement relative to the steering column about a lateral strut axis fixed with respect to the steering column;

control arm means;

first control arm pivot means connecting the control arm means to the steering column for pivotal movement about a rear lateral axis; and second control arm pivot means connecting the control arm to the fork below the strut for pivotal movement about a forward lateral axis.

The shock-absorbing component is thus a single strut positioned in front of the head tube. The control arm controls the movements of the fork below the strut.

In preferred embodiments, the top end of the shock-absorbing strut is pivotally connected to a stem also carrying the handle bars and projecting forwardly from the top of the steering column. The control arm is connected to the bottom end of the steering column and to the fork crown, below the strut.

To minimize the diving effect on braking, the angle on the back side of the strut between the line of action of the strut and the control arm is preferably less than a right angle so that on braking, the braking force on the arm will tend to rotate the arm downwardly, thus tending to raise the steering head and counter the load transfer onto the front wheel.

It is also preferred that the fork is reversible so that the brakes can be arranged either in front of or behind the fork, simply by reversing the fork.

BRIEF DESCRIPTION OF THE DRAWINGS

In the accompanying drawings, which illustrate an exemplary embodiment of the present invention.

DETAILED DESCRIPTION

Figure 1:
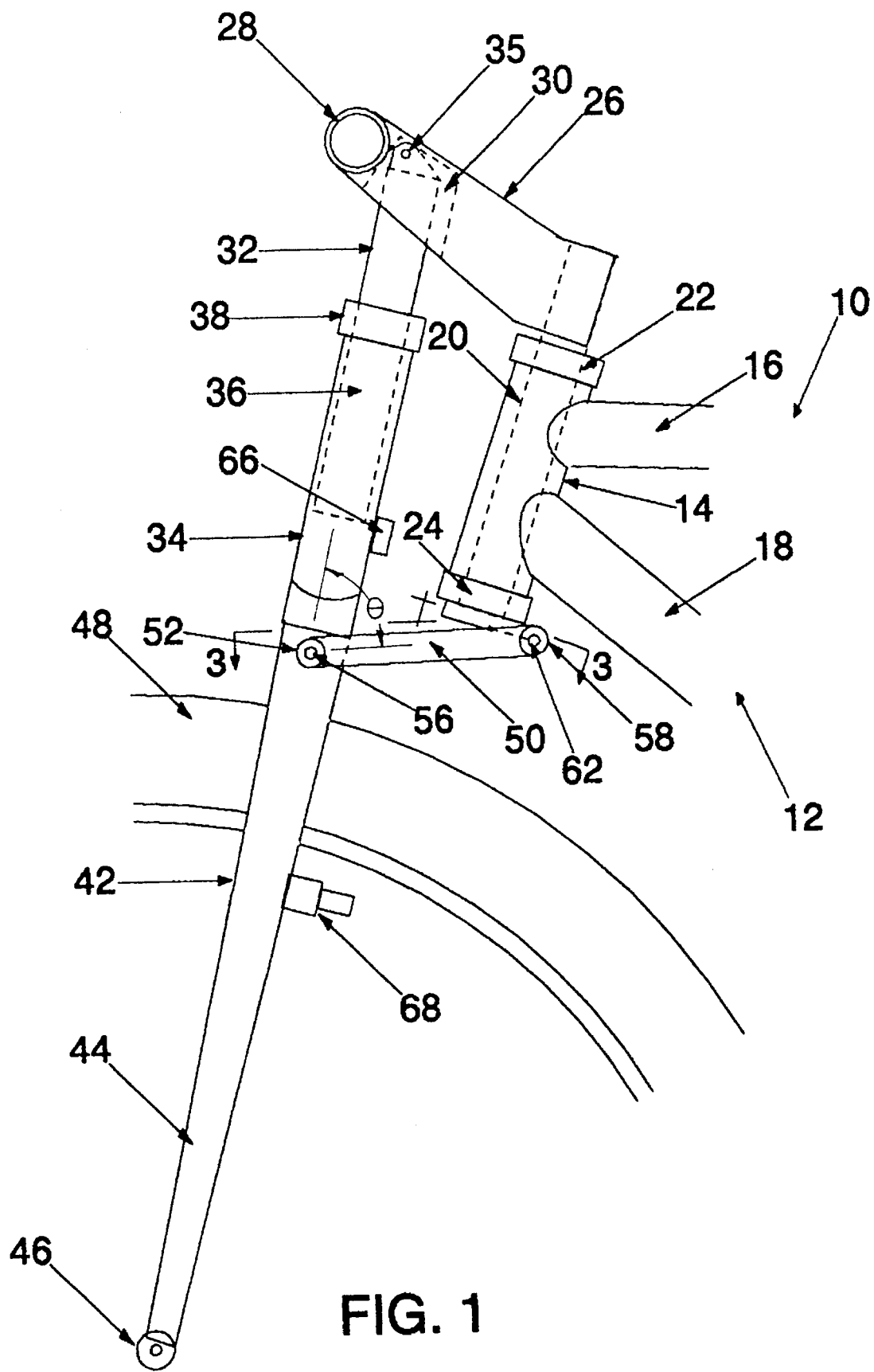
FIG. 1 is a side view of a bicycle fork according to the present invention.
Figure 2:
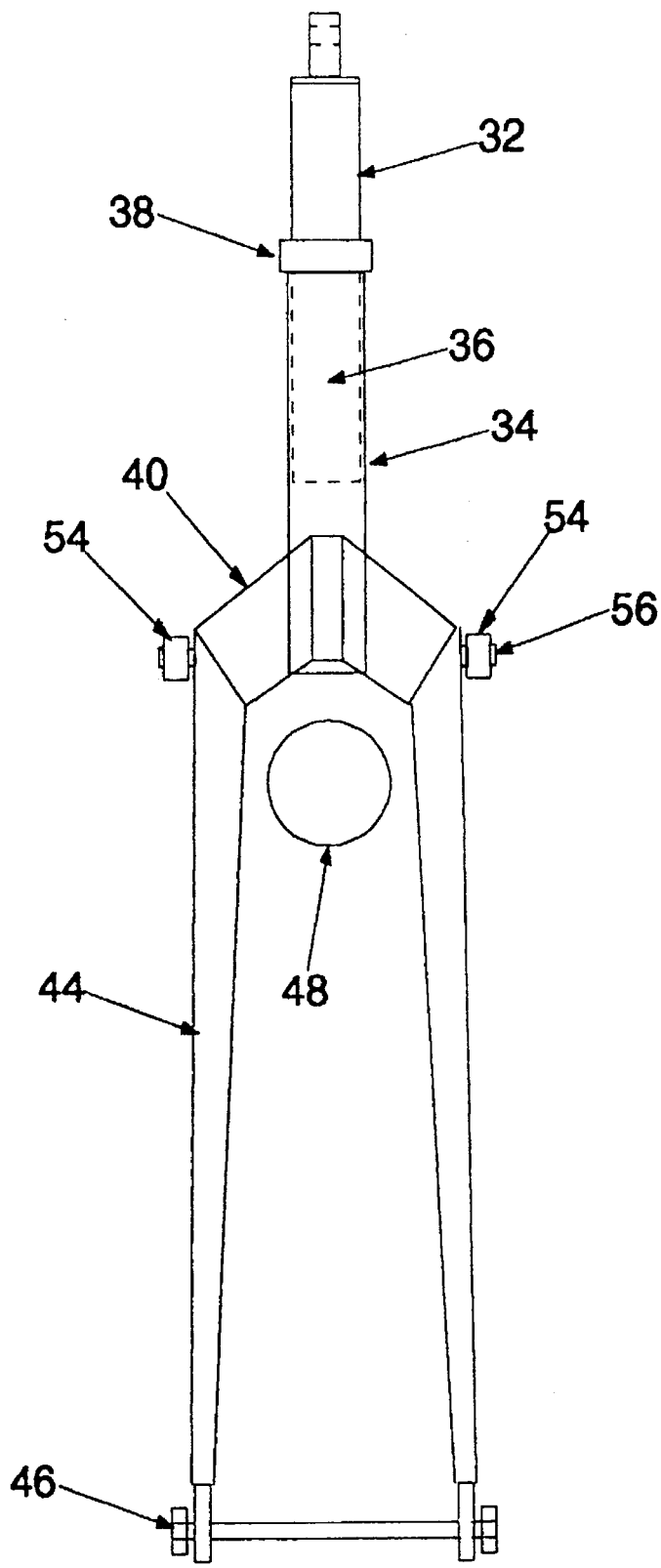
FIG. 2 is a front view of the fork of FIG. 1.
Figure 3:
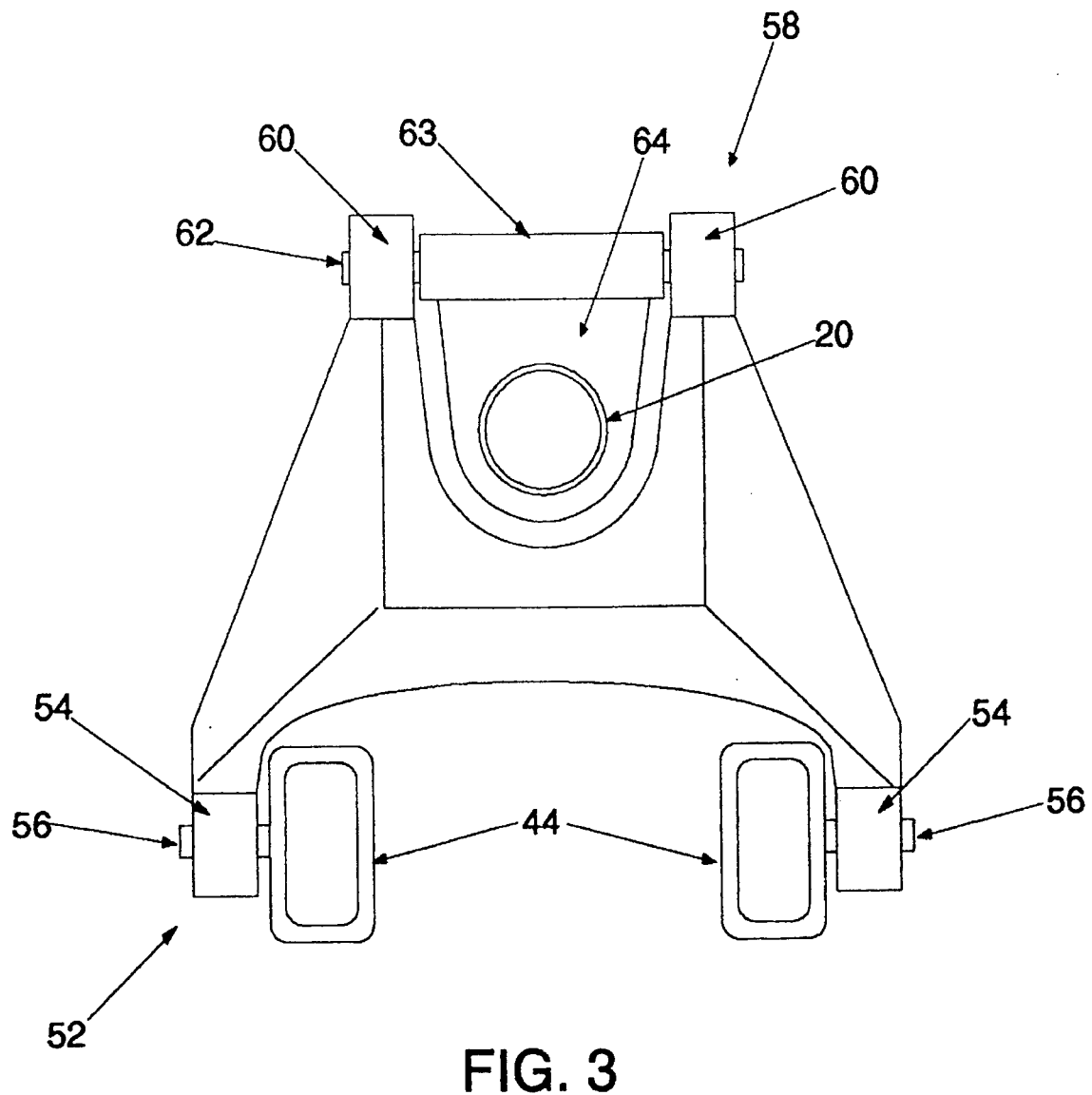
FIG. 3 is a view along line 3—3 of FIG. 1.

Referring to the accompanying drawings, FIG. 1 partially illustrates a bicycle 10 having a bicycle frame 12 including a head tube 14, a top frame tube 16 and a down tube 18. This is a conventional bicycle structure, as is the remainder of the bicycle frame. A tubular steering column extends through the head tube. In a conventional bicycle, the steering column connects directly to the crown of the bicycle fork that carries the front wheel on the bicycle and the top end of the steering column is connected to a set of handle bars.

In the arrangement illustrated, a steering column 20 is supported in the head tube 14 by upper and lower bearings 22 and 24. Above the upper bearing and the head tube, the steering column is connected to a stem 26 that extends forwardly from the head tube and carries a set of lateral handle bars 28.

A slot 30 in the stem 26 receives the rod end 32 of a shock-absorbing strut 34. The rod end is connected pivotally to the strut by a lateral pin 35. The strut 34 has an outer cylinder 36 that slides on and is sealed to the rod end 32 by an annular seal 38 at the top end of the cylinder. The strut 34 is a conventional spring-damper shock absorber with an internal spring resisting contraction of the strut and an internal hydraulic damper that damps rebound of the spring when it has been compressed. The strut acts on a line of action 39.

The bottom end of the strut cylinder 36 is fixed to the crown 40 of the bicycle fork 42. The fork has two straight fork blades 44 that carry the lateral axle 46 of the front bicycle wheel 48.

A control arm 50 couples the steering column 20 and the fork 42. The control arm has a fork end 52 with two spaced lugs 54 located on opposite sides of the fork crown 40. The lugs are connected to the fork crown by respective lateral pivot pins 56. The opposite end of the control arm is a column end 58 with two laterally-spaced lugs 60 that extend to the back side of the head tube and steering column and are connected by a lateral pivot 62 to a lateral bushing 63 fixed to the end of the steering column 20 by a column end fitting 64. The angle θ on the back side of the strut between the line of action 39 of the strut 34 and the control arm 50 is less than a right angle.

The cylinder 36 of the strut 34 carries a cable stop 66 part way up, while each of the fork blades 44 carries a brake boss 68. The cable stop and brake bosses are used for carrying a conventional front wheel brake system. As illustrated, the brakes are in a trailing position on the wheel, an arrangement that is sometimes preferred because it provides a greater braking effect. However, by releasing the pivot pins 56 connecting the control arm 50 to the fork crown and reversing the fork, the brakes can readily be positioned in front of the fork.

In use of the shock-absorbing suspension, shocks applied to the front wheel will be transmitted through the fork to the shock-absorbing strut 34. The strut will contract to reduce the shock transmitted from the wheel to the handle bars and the frame of the bicycle. The internal damping of the shock absorber will control rebound of the spring suspension.

This configuration of shock-absorbing suspension may readily be installed on any existing bicycle using the existing head tube. The bicycle frame orientation with respect to the ground remains the same because the head tube does not need to be raised to accommodate the shock-absorbing system.

When the front brakes are applied, the front wheel will be retarded with respect to the bicycle frame. This will produce a load transfer onto the front of the bicycle, tending to collapse the strut 34. Because the angle θ between the strut and the control arm 50 is less than 90°, the braking force transmitted to the control arm will have a component tending to pivot the control arm downwardly and to the rear. This forces the head tube upwardly to resist the "diving" action that would otherwise occur as a result of the collapse of the load-carrying strut 34 during braking.

While one particular embodiment of the invention has been described in the foregoing, it is to be understood that other embodiments are possible within the scope of the invention. The invention is to be considered limited solely by the scope of the appended claims.

I claim:

1. A bicycle fork for use with a bicycle having a frame with a head tube, said fork comprising:

a steering assembly including:

a steering column adapted to be mounted rotatably in the head tube; and steering means secured to the steering column for rotating the steering column;

a strut comprising a linearly extendible and contractible shock absorber with an upper end and a lower end movable linearly with respect to the upper end;

a fork mounted rigidly on the lower end of the strut to prevent any relative movement of the fork on the lower end of the strut, the fork extending downwardly from the strut for mounting a bicycle wheel for rotation about a lateral wheel axis;

upper strut mounting means connecting the upper end of the strut to the steering assembly for pivotal movement only of the strut and fork relative to the steering assembly about a single lateral strut axis fixed with respect to the steering column;

control arm means;

first control arm pivot means connecting the control arm means to the steering column for pivotal movement about a rear lateral axis; and second control arm pivot means connecting the control arm means to the fork below the strut for pivotal movement about a forward lateral axis.

2. A fork according to claim 1 wherein the upper strut mounting means comprise a stem secured to the steering column at an upper end thereof, and projecting forwardly therefrom, and upper strut pivot means pivotally connecting the strut to the stem.

3. A fork according to claim 2 wherein the steering means comprise handle bars secured to the stem.

4. A fork according to claim 2 wherein the first control arm pivot means comprise means connected to the steering column at a bottom end thereof.

5. A fork according to claim 1 including brake means mounted on the fork for engaging a wheel at a position adjacent the fork.

6. A fork according to claim 5 wherein the second control arm pivot means are reversible whereby the fork is reversibly connected to the steering column.

7. A fork according to claim 1 wherein the strut has a line of action and an angle between the line of action and the control arm on that side of the strut facing the steering column is less than a right angle.

8. In a bicycle having a frame including a head tube, a steering column rotatably mounted in the head tube, handle bars, handle bar mounting means securing the handle bars to the steering column for rotating the steering column, and a fork connected to the steering column to rotate therewith, the improvement wherein:

a strut has a lower end rigidly mounted on the fork to prevent any relative movement of the lower end of the strut and the fork;

the strut extending upwardly from the fork forwardly of the head tube;

the strut being an extendible and collapsible shock absorber;

the strut having an upper end pivotally connected to the handle bar mounting means to travel therewith; and a control arm is pivotally connected to the steering column below the head tube and to the fork below the strut.

9. A bicycle according to claim 8 including brakes mounted on the fork for engaging a wheel at a position adjacent the fork.

10. A bicycle according to claim 9 wherein the fork is reversible on the control arm.

11. A bicycle according to claim 8 wherein the strut has a line of action arranged at an angle to the control arm that is less than a right angle on that side of the strut facing the steering column.

12. A bicycle according to claim 8 wherein the strut is a spring-damper shock absorber.

* * * * *